March 3, 1931.  F. W. DWYER  1,795,085
MECHANICAL COUNTING DEVICE
Filed April 15, 1929  2 Sheets-Sheet 1
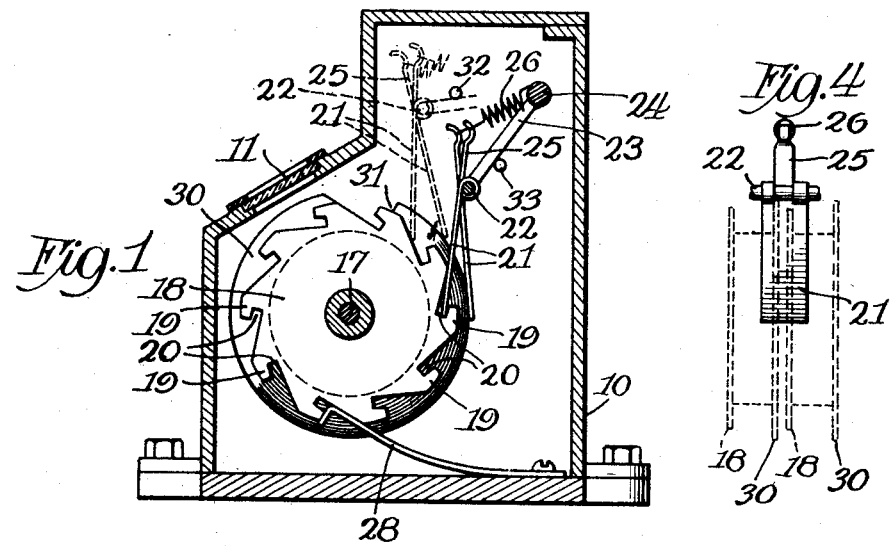
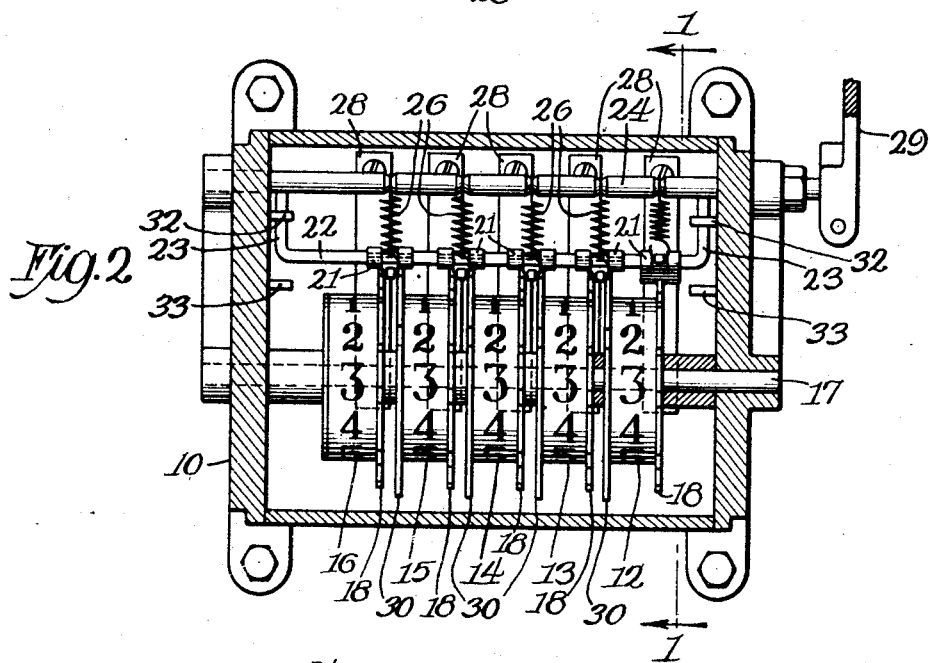
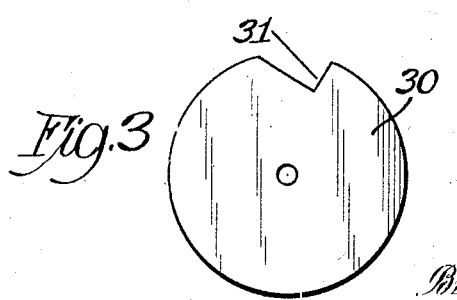
Inventor:
Frank W. Dwyer
By Gilson Mann & Co.
Attorneys.

March 3, 1931. F. W. DWYER 1,795,085
MECHANICAL COUNTING DEVICE
Filed April 15, 1929 2 Sheets-Sheet 2
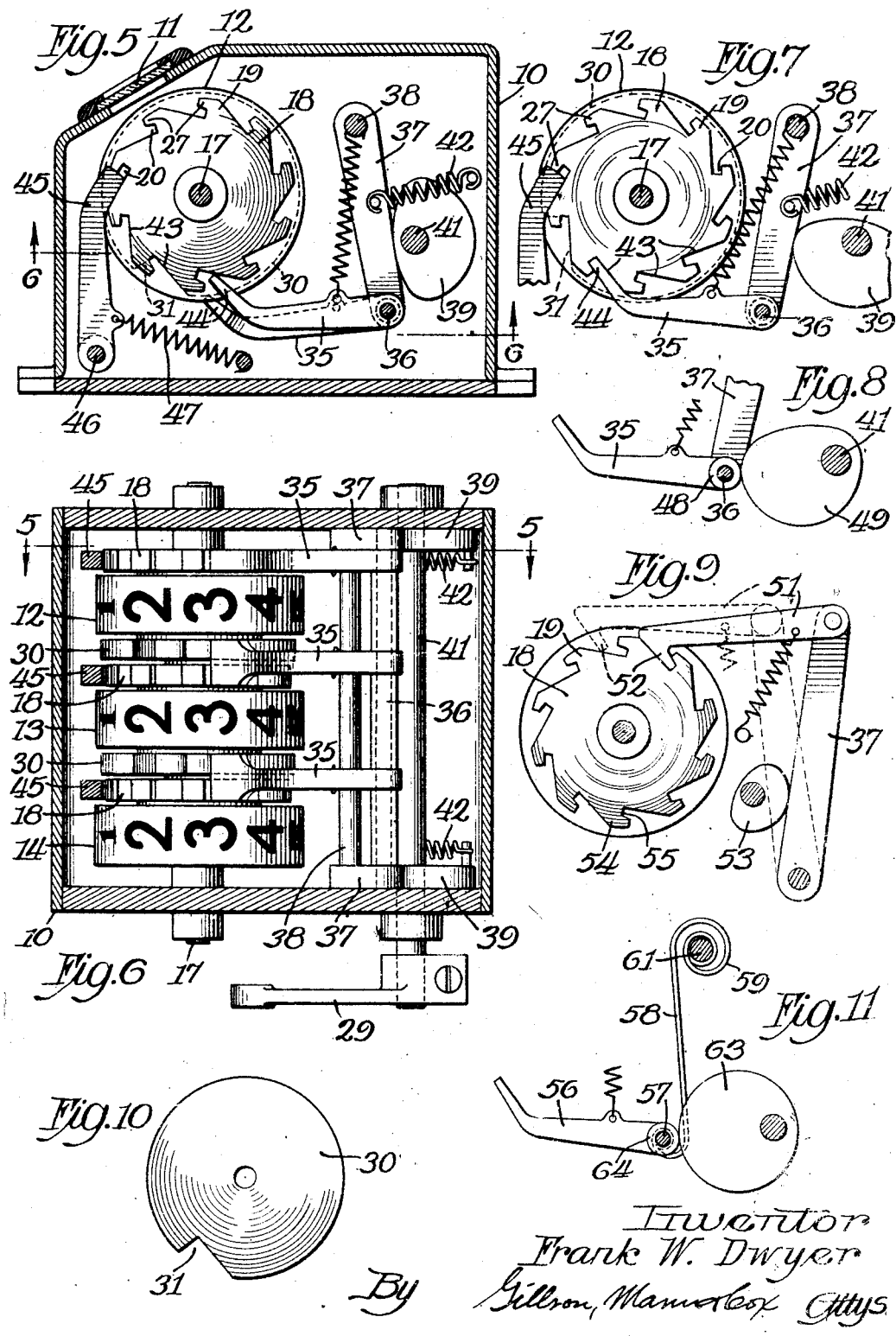
Inventor
Frank W. Dwyer
By Gillson, Manne Cox Attys Patented Mar. 3, 1931

1,795,085

UNITED STATES PATENT OFFICE

FRANK W. DWYER, OF OAK PARK, ILLINOIS

MECHANICAL COUNTING DEVICE

Substitute for application Serial No. 339,787, filed February 14, 1929. This application filed April 15, 1929. Serial No. 355,411.

The invention relates to counting devices of the type comprising a plurality of numeral wheels, each having the ten digits inscribed on its periphery, with means for turning the wheels step by step, the wheel representing the units being moved at each application of power and each of the remaining wheels being advanced one step upon the complete rotation of its neighbor to the right;
and the principal object of the invention is to provide improved and simple means for turning the numeral wheels.

Another object of the invention is the provision of new and improved means for preventing overthrow of ratchet wheels during their advance movement.

A further object of the invention is the provision of a new and improved counting device that is cheap to manufacture, easily assembled, simple in construction, composed of a minimum number of parts, and that is strong and durable.

Other and further objects and advantages of the invention will appear from the following description taken in connection with the accompanying drawings, in which Fig. 1 is a section view on the line 1—1 of Fig. 2;

Fig. 2 is a plan view of the mechanism of the device, the casing being shown in plan section;

Fig. 3 is a side elevation of one of the elements of the mechanism;

Fig. 4 is a rear elevation of one of the pusher pawls showing a cooperating ratchet and disc in dotted lines;

Fig. 5 is a section on line 5—5 of Fig. 6, showing a modified form of construction;

Fig. 6 is a section on broken line 6—6 of Fig. 5;

Fig. 7 is a side elevation of a portion of the operating mechanism showing the pawls in advanced position for operating the ratchet wheels;
Fig. 8 is a side elevation of a modified form of pawl operating mechanism;

Fig. 9 is a view similar to Fig. 7 but showing a modified form of construction;

Fig. 10 is a side elevation of one of the discs employed in connection with the form of the device shown in Fig. 9; and Fig. 11 is a side elevation of a modified form of actuating pawl.

For the purpose of disclosure the invention will be shown and described as being embodied in counting mechanism.

This mechanism is enclosed in a casing 10 of any desired and suitable form, this casing being provided with an observation opening 11 before the numeral wheels. The form and arrangement of the casing and its opening are quite immaterial to the present invention.

The numeral wheels are shown at 12, 13, 14, 15 and 16. Their number will be determined, usually, by the extent to which the registration is to be carried. These wheels are loosely mounted upon a shaft 17, fixed or journaled in the side walls of the casing
10. Fixed to one of the side faces of each of the numeral wheels is a ratchet wheel 18, its teeth 19 being undercut as shown at 20. A pusher pawl 21 cooperates with each of the ratchet wheels 18. These several pawls are pivotally carried by the wrist element 22 of a pair of crank arms 23 carried by an oscillating shaft 24 journaled in the side walls of the casing 10.

Suitable means are provided for holding the pawls 21 in engagement with their respective wheels. As shown, each of the pawls 21 is provided with a rearwardly extending arm 25 between which and the shaft 24 there reacts a retractile spring 26 for urging the pawl 21 against the wheel 18 with which is cooperates.

In the form of construction shown in Figs. 1 to 4 the several pawls are flexibly elastic and when thrust forward their ends engage under the overhanging portion 27 of one of the teeth of the ratchet wheel. As the wheel is turned by the advance of the pawl, its next tooth comes into engagement with the pawl and slightly bows or flexes it.
The friction between the pawl and the two teeth with which it is engaged prevents overthrow of the wheel. A retaining pawl 28 cooperates with each of the ratchet wheels 18 and, as shown, consists of a leaf spring secured to the bottom of the casing 10 and bearing upwardly against the periphery of the ratchet wheel, its end coming into engagement with the face of one of the teeth at the end of each advance step of the wheel.

The shaft 24 is provided with any suitable form of hand crank 29 by means of which it may be oscillated.

While all of the pawls 21 are carried by the wrist element 22 and consequently move in unison, only the one cooperating with the units numeral wheel is continuously in engagement with the ratchet wheel thereof. The other remaining pawls normally ride on the periphery of a disk 30 secured to and consequently rotating with the numeral wheel of the next lower denomination, and of slightly greater diameter than the ratchet wheels. Each of the disks 30 is provided with a peripheral recess 31, into which the pawl riding upon the disk may enter to permit its engagement with the ratchet wheel associated with the numeral wheel of the next higher denomination. The recess 31 is so located that it provides clearance for the pawl, to permit its engagement with the ratchet wheel with which it cooperates as the numeral wheel to which the disk is attached completes a rotation.

Stops 32 and 33 limit the upward and downward movement respectively of the crank arms 23.

The form of the device shown in Figs. 5 and 6 differs from that previously described in that the operating mechanism is different. In this form of construction the unit numeral wheels 12, the tens 13 and the hundreds 14, and the corresponding ratchet wheels 18, are the same as in the previous description.

The means for rotating the wheels comprise a rigid operating pawl 35 for each ratchet wheel. The pawl is pivotally mounted on a shaft 36 which in turn is oscillatably mounted as by means of the arms 37, supported from the shaft 38. The pawls 35 are so shaped at their free ends as to enter the undercuts 20 of the ratchet teeth 19 for operating the corresponding ratchet wheel. They are held in contact with their corresponding ratchet wheels or disks 30 by suitable resilient means such as springs, as shown in Fig. 7.

The pawl 35 is adapted to be oscillated forwardly by any appropriate means as the cams or cam members 39 mounted on the rock shaft 41, and which are adapted to engage the arms 37 as shown in Figs. 5 and 6. The cams or cam members 39 may, if desired, be so constructed that the strike member or crank 29 may be oscillated forwardly or backwardly or may be rotated for operating the pawl. Springs 42 yieldably hold the arms 37 in contact with the cams 39 for causing the pawls to move in response to the movement of the cams.

Suitable means are provided for preventing overthrow of the ratchet wheels when the same are moved forwardly by the pawls. Preferably this means comprises cooperating mechanism on the wheels and pawls.

As shown, the teeth are each provided with a straight portion 43 arranged on a chord of the ratchet wheel and the cooperating pawl is provided with an angular end 44 which, when the pawl is at its forward position, enters the undercut 20 and engages the straight edge 43 on one side and the overhang 27 on the other, whereby further forward movement of the pawl or of the ratchet wheel is prevented.

Suitable retaining pawls 45 mounted on a shaft 46 and held in contact with their respective ratchet wheels by springs 47 are adapted to prevent reverse movement of said wheels.

The form of construction shown in Fig. 8 differs from that shown in Figs. 5, 6 and 7 in that the shaft 36 is provided with anti-friction rollers 48 against which the cams 49 are adapted to engage.

In the form shown in Fig. 9 the operating pawls are adapted to move in the opposite direction from that shown in Figs. 5, 6 and 7. The pawls 51 are provided with hooked ends 52 which are so constructed as to engage the ratchet teeth 19 and fit into the undercuts 20 in a manner already described for preventing overthrow of the ratchet wheels. In this form of construction the cams 53 engage the forward sides of the links 37 instead of the rear edges thereof as in the previously described construction.

When the form of pawls shown in Fig. 9 is employed, the disks 54 which correspond to the disks 30 in Figs. 1 to 8 are provided with notches 55 turned opposite to the disks 30. In other words, the disks 30 must be reversed or turned over when the pawl construction shown in Fig. 9 is employed.

In the form of construction shown in Fig. 11 the pawls 56 are mounted on a bar 57 that is supported by hangers 58 which are resiliently flexible. The upper ends of the hangers terminate in a coiled resilient portion 59 rigidly connected to a fixed rod 61. The cams 63 will engage the rollers 64 and force the hanger arms 58 forwardly and the resilient end 59 will hold the rollers in contact with the cams for returning the pawls to normal position for engaging the following tooth.

While the forms of construction disclosed are highly efficient, the invention may be variously modified within the scope of the appended claims.

Resetting mechanism may be applied to the device, but is not shown, as it forms no part of the present invention.

Though the invention is characterized as relating to counting devices, it may be used in connection with any form of machine such as adding and calculating machines, etc., in which a plurality of numeral wheels are employed and used to indicate numbers.

This is a substitute for my application Ser. No. 339,787 filed February 14, 1929.

I claim as my invention:

1. In combination, a ratchet wheel provided with teeth, each having an overhanging portion, a pawl for operating said wheel, said overhanging portions being adapted to engage said pawl for preventing overthrow of said wheel, and means for operating said pawl to rotate said wheel.

2. In combination, a wheel member provided with teeth, a pawl member for engaging said teeth for rotating said wheel, and means on one of said members cooperating with the other member for preventing overthrow of said wheel member, and means for operating said pawl.

In testimony whereof I affix my signature.

FRANK W. DWYER.